Figure 1:
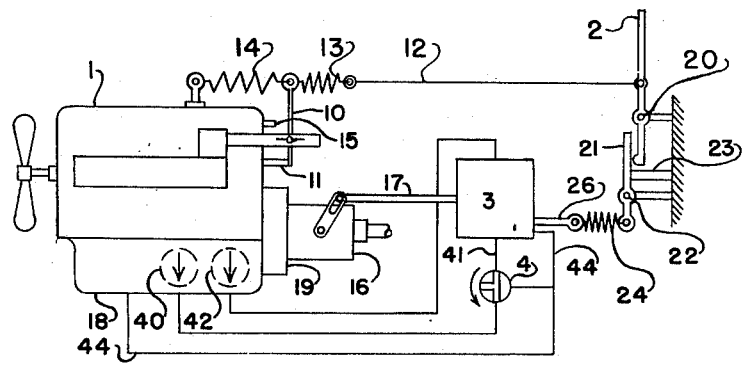

Sept. 26, 1950     B. I. SEEGER     2,523,726
POWER CONTROL FOR TRANSMISSIONS
Filed Feb. 15, 1944     2 Sheets—Sheet 1

Inventor
BERNARD I. SEEGER
By Reynolds + Beach
Attorney

Sept. 26, 1950      B. I. SEEGER      2,523,726

POWER CONTROL FOR TRANSMISSIONS

Filed Feb. 15, 1944      2 Sheets-Sheet 2

Inventor

BERNARD I. SEEGER

By Reynolds + Beach

Attorney

Patented Sept. 26, 1950

2,523,726

UNITED STATES PATENT OFFICE 2,523,726

POWER CONTROL FOR TRANSMISSIONS

Bernard I. Seeger, Seattle, Wash., assignor to Boeing Airplane Company, a corporation of Delaware Application February 15, 1944, Serial No. 522,407

10 Claims. (Cl. 74—336)

1

The present invention relates to a power control, and more particularly to a device for controlling the transmission of power from a driving element to a driven element as the power requirement of the driven element varies, while at the same time power for the driving element is developed most efficiently.

In drive arrangements operated by an internal combustion engine, for example, the power delivered to the driven element is customarily controlled by one or both of two expedients, namely, varying the amount of power produced by the engine at a given speed, and varying the mechanical advantage, that is the relative speeds, between the driving and driven elements by regulating the drive ratio of the transmission connecting them. In the following discussion the term "drive ratio" will be considered as changing in the same sense as the mechanical advantage, an increase in drive ratio producing an increase in the mechanical advantage of the drive between the driving and driven elements, corresponding to an increase in the speed ratio of the driving and driven elements, and vice versa.

The most common way of varying the power produced by an internal combustion engine is to change the amount of fuel supplied to it, such as by regulation of a throttle. With the throttle fully opened the maximum power of the engine is developed at only one speed, designated the rated engine speed. A given lesser power may be developed at various engine speeds depending upon the load factor at which the engine operates. By "load factor" is meant the amount of power developed by the engine at any selected speed as compared to the power which it could develop at such speed if the maximum amount of fuel capable of being converted to added power by the engine at such speed were supplied, such as by the throttle being fully open. To operate the engine at less than full load factor the fuel supply is restricted, for example by moving the throttle toward closed position, but a greater amount of fuel is then required to develop the same power. The greater the load factor at a given engine speed the better is the economy of operation.

To employ the power of a prime mover, such as an internal combustion engine, most effectively, therefore, it is desirable to operate the engine under full load factor at all speeds above its minimum smooth operating speed. When less power is required than that developed at such minimum speed under full load factor the drive

2 ratio should be adjusted as necessary to maintain the engine speed constant at such minimum value. To reduce the power developed under such conditions so that it does not exceed the power required the fuel supply to the engine will, of course, be decreased appropriately, thus reducing the load factor somewhat below 100%. The engine load factor and minimum speed may be controlled in this manner for progressively varying power requirements by a transmission connecting the driving and driven elements which affords an infinite variety of drive ratios.

I have devised a single control operable to control conjointly an infinitely variable ratio transmission and the fuel supply of an engine driving it. The engine may idle at a selected minimum smooth speed. To increase the power developed the throttle will be opened, but the drive ratio will be decreased to prevent an increase in engine speed until the throttle has been opened fully. If more power is desired than can be developed by the engine at its minimum smooth speed further movement of the control will increase the drive ratio, and consequently the engine speed, while the throttle remains fully open. The engine therefore operates at maximum load factor at all times, and the operator is unaware of the transition from partial to full load factor operation, which is effected automatically.

In employing my control in conjunction with a transmission affording an infinite variety of drive ratios it is therefore a principal object to vary the transmission drive ratio automatically, so that the engine will operate at full load factor at all speeds above a selected minimum speed. For a given power developed, at vehicle speeds below that corresponding to minimum engine speed at maximum load factor the transmission drive ratio and the engine fuel supply are controlled conjointly to operate the engine at the highest load factor attainable consistent with smooth engine operation, affording the greatest fuel economy. The control further prevents operation of the engine at any time at a speed exceeding that at which maximum power is developed, by reducing the drive ratio rather than by limiting the amount of fuel delivered to the engine.

It is a further object to control the amount of power delivered to the driving element simply by actuation of a single control member, which operates automatically to vary the drive ratio and, when necessary, the engine fuel supply also. Moreover improved acceleration flexibility is secured, although the mechanism is of simple construction. In the event of its failure, or at will, my control can be rendered inoperative and the transmission placed directly under the control of the operator. Alternatively he may regulate my drive ratio control by itself independently of the fuel supply.

Because of the lower engine speeds possible when my control is used wear on the parts is reduced, and, except when nearly the maximum available power is being utilized, the operation of the driving mechanism is unusually quiet and smooth.

Further objects and capabilities of my control will be discussed in connection with the following detailed description of one operative form and application of the device. Such description and the mechanism illustrated in the drawings relates to a representative example of an installation in which my control may be employed, namely, for controlling the drive of an automobile by a throttle-governed internal combustion engine, but it will be readily apparent to persons familiar with power equipment that such a control may be utilized with a prime mover of different type or for actuating other driven mechanisms. For such additional uses of my control, or even for an automobile installation, it will be understood that various changes in the control unit and the manner of its association with other parts of the mechanism can be made within the scope of my invention as defined in the appended claims.

Figure 2:
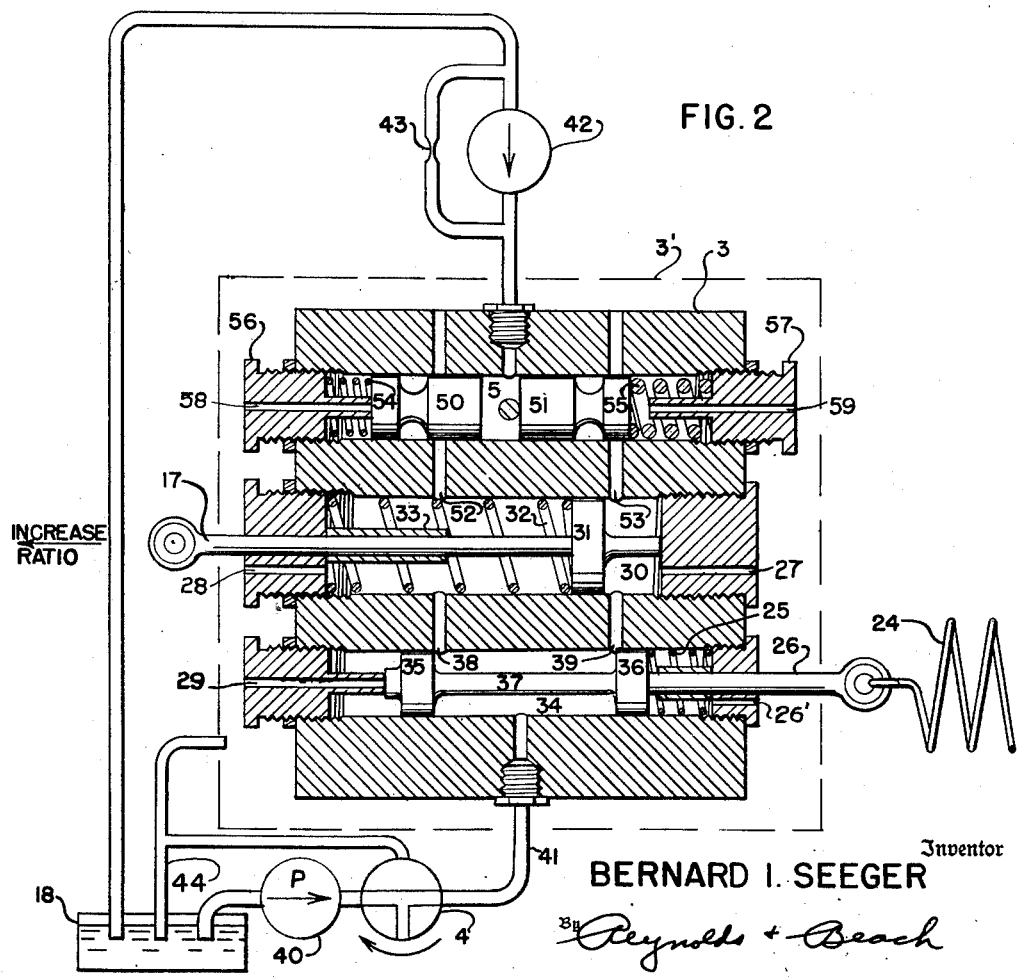

Figure 1 is a diagrammatic side elevation view of an internal combustion engine and transmission system to which my control is applied, and Figure 2 is a sectional view through the control unit itself, shown in conjunction with other parts of the system illustrated diagrammatically.

Figures 3 to 6 inclusive are graphs representing various operational characteristics of a system controlled by my device in comparison with a similar arrangement incorporating a transmission capable of operating at only a few predetermined drive ratios.

The operation and characteristics of my control can be understood most readily by considering it when applied to a particular typical installation, an automobile having been selected as a good example. The power required for operating such an automobile at various speeds under level road conditions is represented by the curve A—B of Figure 3. This curve indicates that the power required to drive the automobile increases rapidly with faster speeds in the high speed range.

The absolute top possible speed of the automobile is determined by the power which can be supplied by the engine. Its maximum or rated power is developed at only one definite engine speed, which is not its maximum speed. Engine power increases generally proportionately to the increase in its speed until it approaches that at which maximum power is developed. The power available from the engine at one drive ratio is represented by curve A—C in Figure 3, which illustrates the reduction in the rate of power increase just before the curve crest D, corresponding to maximum power, is reached. At this engine speed and power although it were attempted to increase the engine speed beyond this crest the power produced by it would actually drop so that no increase in vehicle speed but a drop would actually result if the vehicle continued to run on the level.

Figure 3:
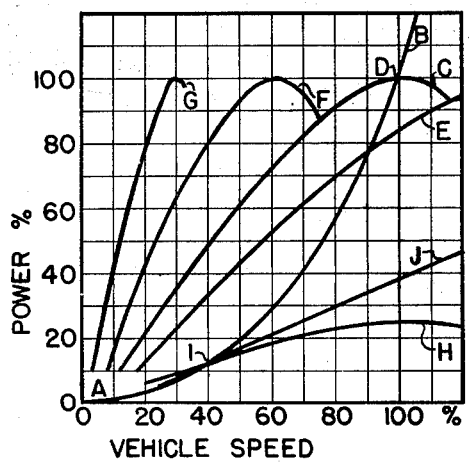

In order to obtain the greatest possible speed of the automobile when a conventional change gear transmission is employed, therefore, it is essential that one of the drive ratios, for example the third gear ratio, be selected such that the power required curve A—B intersects the full load factor power available curve A—C at its crest D, as shown in Figure 3. Since the respective ordinate intercepts between the power available curve A—D and the power required curve A—B at the various speeds determine the excess power capable of effecting acceleration, a third gear drive ratio affording greater mechanical advantage is sometimes selected, refining a steeper power available curve which would intersect the power required curve beyond the crest of the former. Such a curve might be similar to curve A—N of Figure 5. While such selection would afford greater accelerative ability for the automobile at more customary driving speeds, it is achieved only with a sacrifice in the top speed and the economy of operation. Moreover at the maximum speed of the automobile the engine would not be developing its full power, and additionally would be operating at a speed higher than should be permitted. An infinitely variable transmission can be adjusted by my control to afford full engine power for maximum acceleration at any vehicle speed without the engine overspeeding.

A power required curve for descent of the automobile would be of a shape generally similar to the level road condition curve A—B, but its slope would be more gradual and the ordinate indicating the power required for any selected speed would be less, so that a power required curve depicting some descending condition of the automobile would intersect the maximum power crest of curve A—E, representing the power available when a change gear transmission is operated in fourth gear.

For an ascending automobile the power required curve would be steeper than curve A—B at every speed, its slope and particular contour depending upon the degree of the grade. Consequently a change gear transmission must have additional drive ratios, curve A—F representing the power available in second gear, and curve A—G that developed in first gear at full load factor. The use of second gear also affords more surplus power for acceleration under level road conditions than third gear at speeds below 75% of maximum speed but at higher speeds a greater margin of power is available in third gear.

Much of the operation of an automobile occurs at speed in the region of 40% of its maximum speed, in which range a large surplus of power can be developed for acceleration with the transmission in third gear. This situation is indicated by the intercept between the power required curve A—B and the third gear, power available curve A—C on the ordinate of point I corresponding to 40% of maximum level road speed. In fact, at such a speed and drive ratio the engine is operating at only about 25% load factor, as represented by curve A—H which intersects the power required curve A—B at point I. Travel of the automobile at such constant speed and load factor is, of course, accomplished by greatly reducing the amount of fuel delivered to the engine, such as by regulation of the throttle to a partially open position.

Figure 4:
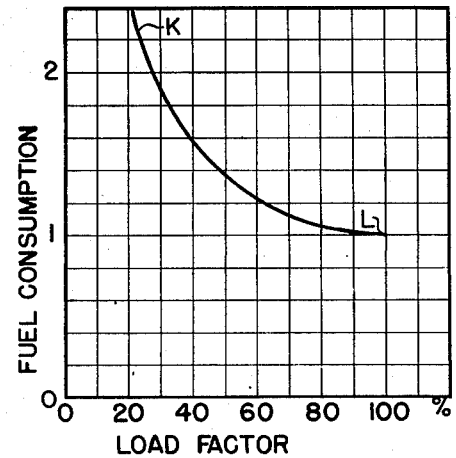

When an automobile having a change gear transmission is operated at a low load factor tests show that the economy of operation is considerably poorer than if a drive ratio could be employed which would enable the engine to be operated at full load factor. Such a drive ratio is represented by curve A—J also intersecting the power required curve A—B at point I. The difference in fuel consumption for operation of the engine at various load factors may be illustrated best by one typical example. 13% of the power required for full speed operation is necessary to maintain a speed of 40% of maximum speed under level road conditions, corresponding to point I on curve A—B. This power can be produced either with the third gear ratio of curve A—C when operating at 25% load factor, as represented by curve A—H, or at the drive ratio of curve A—J under full load factor. Curve K—L in Figure 4 is a typical fuel consumption curve for 13% of full power. It shows the 110% more fuel is required when the engine operates at the 25% load factor of curve A—H than under the full load factor operation of curve A—J. When a change gear transmission is employed the engine is operated most of the time at fractional load factor. Full load factor operation over a wide range of speed and road conditions can only be accomplished by the use of an infinitely variable drive ratio transmission, which obviously is desirable for reasons of economy, as illustrated by the example given.

The problem is, therefore, to devise an automatic control which will regulate an infinitely variable transmission and the fuel supply conjointly. At the lowest smooth operating speed of the engine it is found that the power developed at full load factor would maintain a vehicle speed of 40% of its maximum speed under level road conditions. Consequently the minimum drive ratio is represented by curve A—J and the maximum ratio may be such as represented by curve A—M in Figure 5. The control must enable the driver to alter the drive ratio throughout the intervening range to accelerate or decelerate the automobile.

The minimum drive ratio curve A—J thus selected would intersect the level road vehicle speed power required curve A—B at point I, corresponding to 40% of the maximum speed. An infinitely variable drive ratio transmission, if properly controlled, could therefore operate at the drive ratio corresponding to any power available curve intermediate curves A—M and A—J as might be required for operation of the engine at 100% load factor at a steady vehicle speed between 40% and 100% of top vehicle speed, or to accelerate the vehicle at various rates. Such intermediate drive ratios would, of course, include ones equal to those of the several gears of a change gear transmission represented, for example, by curves A—E, A—C, A—F and A—G of Figure 3, as well as others, of which that corresponding to curve A—N in Figure 5, intermediate the drive ratios of second and third gears, and that for curve A—O intermediate the minimum drive ratio and the fourth gear ratio indicated, are further examples.

The versatility of a control for an infinite drive ratio transmission necessary to enable the driver to accelerate or to decelerate the automobile at will, and to the extent desired, may now be considered. With my control the drive ratio may be changed practically instantaneously from one value to another throughout the range between the maximum drive ratio of curve A—M and the minimum drive ratio of curve A—J. It will be understood, of course, that the drive ratios of these lines are only representative, and are established by operating limitations of the infinite drive ratio transmission, the particular construction or nature of which is not part of my invention, rather than by restricted capabilities of my control, although it may act to confine the variation in drive ratio to a portion of such maximum range, if desired.

Figure 5:
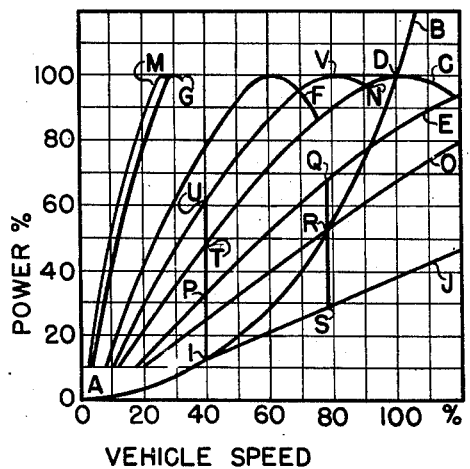

Assuming, for purposes of illustration, that an automobile employing my control in conjunction with an infinitely variable drive ratio transmission is operating on a level road at a speed 40% of the maximum level road speed, corresponding to point I in Figure 5, the driver may accelerate the automobile by operation of my control to change the drive ratio from that of curve A—J along line I—P to that of point P on curve A—E, for example. The intercept I—P now represents excess power, which will act to increase the speed of the automobile. If this new drive ratio of curve A—E is maintained until point Q is reached, the automobile speed will have increased to 77% of maximum speed, and it will still be accelerating. Travel of the automobile at this speed can be stabilized by the driver now reducing the drive ratio along line Q—R to that represented by curve A—O.

To reduce the automobile speed again to 40% of top speed my control may be operated by the driver to reduce the drive ratio from that of curve A—O along line R—S to the ratio corresponding to curve A—J. The intercept R—S represents a deficiency of power required to maintain the level road speed of 77% of maximum speed, so that the resistance to movement of the automobile will retard its speed at the drive ratio of curve A—J from point S back to point I. Upon reaching such 40% of maximum speed point the automobile will continue to travel at this speed until the drive ratio is again changed by the driver, or the power required varies by operation of the automobile at other than level road conditions.

If, when the automobile is traveling at 40% of maximum speed under level road conditions the drive ratio is only increased from that of curve A—J to the ratio of curve A—E, the rate of acceleration would not be as great as for full throttle operation in the case of an automobile having a change gear transmission operating in third gear, such condition being represented by curve A—C. With my control, however, if the drive ratio, instead of being increased from that corresponding to curve A—J only to that of curve A—E, were increased to the ratio represented by curve A—C in Figure 5 along line I—P, an equal excess power intercept I—T would result. In such case the rate of acceleration would be as great by the use of my control as that which could be effected by opening the throttle fully with a change gear transmission operating in third gear. If this drive ratio were then maintained the speed of the automobile would increase at a progressively slower rate until its top speed at point D is reached, the power available meanwhile increasing from T to D along curve A—C in Figure 5.

The ratio of curve A—C does not constitute a limit on the acceleration ability of the automobile when my control is used, however. Indeed, the full load factor drive ratio can be increased to that represented by any curve which would be intersected at or below its peak power crest by line I—P extended. Accelerative ability surpassing that of which an automobile having a change gear transmission would be capable is thus afforded, even though such transmission were shifted from the third gear ratio of curve A—C to the second gear ratio of curve A—F in Figure 3 to render more excess power available. In fact my control enables the drive ratio for effecting the maximum acceleration to be established at any speed, namely, that ratio at which the full power of the engine is available by its operation at its rated speed.

My control has a further important advantage over the change gear transmission automobile besides its capability of being shifted from one drive ratio to another to maintain operation of the engine at full load factor automatically. If for purposes of greater acceleration from 40% of maximum speed the change gear transmission is shifted from third gear to second gear the power available will increase until the crest of second gear curve A—F in Figure 3 is reached. As the automobile speed increases beyond that point the power available decreases, and it could not again be increased by any expedient until the automobile speed exceeds that corresponding to the intersection of second gear curve A—F with third gear curve A—C. At that time, by shifting from second gear to third gear, the power available could again be increased, along curve A—D, with increase in speed.

The driver, of course, would have no way of knowing when it would be advantageous to shift from second to third gear in order to obtain excess power, unless he were aware of the speed corresponding to the intersection of curve A—F with curve A—C and gave special attention to making such shift as soon as such speed had been reached. Even if such operation were carried out most efficiently it would be impossible to maintain development of peak engine power through the range between the crests of curves A—F and A—C, for the engine would overspeed in second gear beyond the crest of the former curve and would operate at less than the speed for maximum power after the shift from second gear to third gear. With my control, however, when the drive ratio has been increased to the point where maximum power is developed by the engine the drive ratio will be reduced automatically and progressively as the speed of the automobile increases, so that the engine will continue to develop maximum power at all times until the point D on the power required curve A—B, at the power required equal to the maximum power available is reached.

Thus, for example, if the automobile is traveling at 40% maximum speed the drive ratio may be increased to that represented by line A—N at point U. If this drive ratio is now maintained the power developed will be greater than that which would be available in the case of an automobile employing only a change gear transmission operating in third gear, as represented by curve A—C, and the power would increase along the line U—N to the crest V of this drive ratio curve. As the speed now continues to increase, instead of the power diminishing along line V—N my control automatically reduces the drive ratio progressively from that represented by curve A—N, which was established by the driver, so that the engine cannot overspeed but will be held at that speed where it develops its maximum power. The power available will therefore progress along line V—D until the maximum speed of the automobile at D is attained.

Such operation of my control is obtained by limiting the speed of the engine to that at which maximum or rated power is developed, but this is accomplished not by curtailing the fuel supply, but rather, as stated, by progressively decreasing the drive ratio when the engine speed has increased to that at which it produces maximum power. This situation is pictured somewhat more clearly by the curves of Figure 6, in which ordinates represent engine speed and abscissae vehicle speed, the slopes of the various straight lines from the origin corresponding to the respective drive ratios. While these lines do not indicate power directly, as do those of Figures 3 and 5, the same drive ratios are represented as in the other curves, and consequently the same letters of designation are employed, each with the addition of a prime.

My control automatically decreases the drive ratio as the vehicle speed increases when the engine reaches its maximum power rated speed represented by line M'—D'. The engine speed therefore cannot rise into the area above this line whether or not the engine is developing full power. The conventional change gear transmission drive ratio lines A'—C', A'—E', A'—F', and A'—G', however, extend through this zone, for such a transmission has no control to prevent overspeed, and consequently decreasing power, operation of the engine as the vehicle speed increases.

Comparing variable load factor operation of an engine in an automobile employing a change gear transmission with the operation of my device, a further characteristic must be taken into consideration. Under normal operation encountered in level road conditions we may assume that an automobile with a change gear transmission is operating in third gear. As the vehicle speed varies, therefore, the engine speed changes in direct proportion along line A'—C' of Figure 6. Line W—X, we may assume, represents the minimum speed at which the engine will operate smoothly, which occurs at about 12% of rated engine speed.

When the engine is operated at 100% load factor, however, it will be evident that for any given vehicle speed appreciably below its maximum speed the engine speed is considerably less than in conventional third gear operation. In such case under level road conditions the drive ratio for different vehicle speeds decreases until, at 40% of maximum vehicle speed, for example, represented by point I', the minimum engine speed for smooth operation is reached, instead of at about 12% of maximum vehicle speed, as in the case of change gear transmission third gear operation.

A conventional automobile having a change gear transmission is customarily driven in second or first gear at speeds below 12% of maximum vehicle speed, thus increasing the drive ratio to that of line A'—F' or A'—G', respectively. For this reason the engine seldom operates at speeds below the assumed minimum smooth speed of 12% of rated power engine speed, corresponding to line W—X. When my control is used, however, such engine speed is reached at 40% of maximum vehicle speed, which is in the speed range where the automobile is operated a large part of the time. It is all the more important in this range, therefore, to operate the engine at the highest possible load factor if the best economy of operation is to be obtained, as will be appreciated by reference to the fuel consumption curve K—L of Figure 4, corresponding to power conditions at point I'.

On the other hand, smooth operation of the automobile would be impossible and excessive shock loads would be placed on various elements of the automobile drive mechanism by the uneven operation of the engine if its speed were allowed to be reduced substantially below this minimum desirable speed of approximately 12% of rated power speed. Consequently my control operates to increase the drive ratio progressively for decreasing vehicle speed below 40% of maximum speed sufficiently to maintain the minimum speed of the engine on line I'—W until the maximum drive ratio is reached at point Y corresponding to about 3% of maximum vehicle speed. While such ratio increase reduces the load factor at which the engine operates because it is necessary simultaneously to curtail the supply of fuel to the engine progressively, it still will be operating at all times at the highest load factor and lowest drive ratio consistent with even operation of the engine. Consequently the best possible fuel economy will be obtained, which will be far better than in the case of a change gear transmission automobile operating in third gear, or even in fourth gear.

Figure 6:
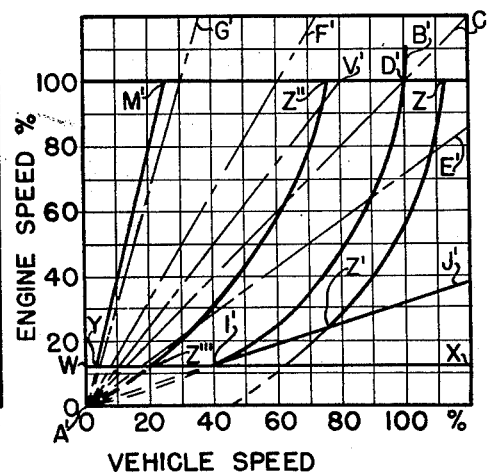

Within the area of Figure 6 bounded by D', M', Y, I', therefore, any drive ratio may be selected. This area is increased by shifting its right boundary from curve D'—I' such as to curve Z—Z', when the automobile is going downhill so that the curve of engine speed required at 100% load factor is A'—Z. Conversely this area is decreased by its right boundary shifting from curve D'—I' to curve Z''—Z''', for example, when the automobile is climbing a hill.

Having now described the type of operation which is effected by my control, the representative construction shown in Figures 1 and 2, illustrating mechanism capable of accomplishing the functions described above, may be discussed. In Figure 1 the engine 1 has a throttle 10 of conventional type, which is shown in full open position, its movement to increase the supply of fuel to the engine being limited by stop 11. Such throttle movement is effected by swinging the operator's power control lever 2 in a clockwise direction about its pivot 20. The throttle 10 and control lever 2 are interconnected by a tension member 12 which incorporates a spring 13, so that after the throttle movement has been interrupted by its engagement with stop 11 the control lever 2 may be swung farther in a clockwise direction. Upon release of lever 2 spring 14 will move throttle 10 toward closed position until it engages idling stop 15. It will be understood that the throttle shown is intended to be conventional and purely illustrative of any equivalent arrangement for controlling the supply of fuel to the engine 1.

As lever 2 is swung farther in a clockwise direction beyond the position shown in Figure 1 it will engage and begin to swing ratio control lever 21 in a counterclockwise direction. Until control lever 2 has been swung into the position shown ratio lever 21 remains stationary because its movement in the clockwise direction about its pivot 22 is limited by stop 23, and the lever is held against such stop by spring 24, and spring 25 in Fig. 2 acting on valve rod 26, which enters into the operation of a selector unit 3. This selector unit selects the drive ratio at which the infinitely variable drive ratio transmission 16 operates, and lever 21 therefore constitutes voluntary control means manipulated by the vehicle operator at will to select the desired operating conditions for the selector unit, and consequently the transmission. Various types of transmissions having infinitely variable drive ratio characteristics may be employed, the drive ratio of which may be altered by lengthwise reciprocation of rod 17. Shifting of this rod to the left, as indicated by the arrow, effects an increase of the drive ratio, while its movement to the right produces a decrease in drive ratio.

While the drive ratio selector 3 may be operated electrically or mechanically, I prefer that it be hydraulic. For this purpose a pressure liquid supply system is provided, which may be rendered inoperative to actuate the selector by operation of a valve 4 to bypass such liquid around the selector to the return. Thereupon a suitable manual control (not shown) may be actuated to shift transmission control rod 17 directly to vary the drive ratio at will. The fluid reservoir 18 may be the crank case of engine 1, or the hydraulic system may be separate from the engine. In any event a pump 40, which may be driven by the engine, supplies liquid from the reservoir 18 through the conduit 41 under substantially constant pressure to the drive ratio selector unit 3. A second pump 42 is driven by engine 1 to subject the selector to hydraulic pressure varying with the speed of the engine. This pump may draw liquid from the same reservoir 18 or a different one, the systems being independent. Provision is made for continual flow of liquid from pump 40 through the selector, whereas a by-pass 43 circumvent pump 42 for recirculation of fluid through it. A return pipe 44 enables the liquid to flow back to the reservoir 18 from the by-pass valve 4 and the interior of a casing 3'- enclosing the drive ratio selector 3. Alternatively the lower portion of such casing itself may constitute the reservoir, and the pumps 40 and 42 may be mounted on such casing and operated by remote drives connected to the engine.

The selector 3 has three chambers which conveniently may be arranged in parallel. The central chamber 30 forms a cylinder for a piston 31 on transmission control rod 17. Normally this piston is urged toward the right into a limiting position corresponding to minimum drive ratio of the transmission, as represented by lines A—J and A'—J' in Figures 3, 5 and 6, by means such as a spring 32 reacting between the left face of piston 31 and the left end of cylinder 30. Movement of this piston to the left is also limited by engagement with a suitable stop 33 in a position corresponding to the maximum drive ratio, represented by lines A—M and A'—M' in Figures 5 and 6. Either or both of these stops, corresponding to maximum and minimum drive ratio, may be adjustable to vary the end positions of piston 31 so that the drive ratio range within which my control is capable of operating may be more restricted than that of the transmission, if desired. Such adjustment is afforded by the screw threaded end plugs closing the ends of chamber 30 shown in Fig. 2. Preferably, however, the stop arrangement for piston 31 will be unvariable and designed for each selector unit to correspond with the particular transmission with which it is to be used.

Variation in drive ratio is, of course, effected by varying the pressure on the opposite faces of piston 31. As shown in the drawing, the opposite ends of cylinder 30 have drain openings 27 and 28 of equal and rather small size communicating with the interior of casing 3' serving as a collecting space for the hydraulic liquid draining from various ports in the selector 3.

At one side of chamber 30 in selector unit 3 is a second chamber 34 which is continually supplied with liquid under substantially constant pressure through pipe 41. This chamber constitutes a cylinder for a double plunger valve, including heads 35 and 36 interconnected in spaced relationship for conjoint movement by a rod 37. This plunger assembly in turn is mounted on or otherwise operatively connected to rod 26, to be shifted by it upon appropriate actuation of ratio lever 21. From the portion of chamber 34 between valves 35 and 36, to which conduit 41 is connected, the hydraulic liquid may flow to chamber 30 through either or both of ducts 38 and 39, controlled, respectively, by valves 35 and 36. No resistance to movement of such valves is created by fluid pressure in the ends of this chamber, for they are vented to the interior of casing 3' through vents 26' and 29 in the end plugs of the chamber, as shown in Fig. 2.

Port 38 communicates with that portion of chamber 30 at the left side of piston 31, so that the pressure exerted on it by such liquid, aided by spring 32, tends to move the piston to the right for reducing the drive ratio. Port 39 is located to supply hydraulic liquid to the portion of chamber 30 at the right of piston 31, to exert a pressure on it against the resistance of spring 32 and the liquid pressure on the other side of the piston, and tending to move the piston to the left for increasing the drive ratio. Furthermore, these ports are arranged so that, as valve 35 is moved in a direction to restrict port 38, thus tending to reduce the drive ratio, valve 36 is moved correspondingly to enlarge port 39 for admitting more liquid to the right side of piston 31, thus magnifying the tendency to increase the drive ratio.

Normally the relative openings through ducts 38 and 39, as established by the position of lever 2 effecting movement of valves 35 and 36, will determine the drive ratio at which the transmission operates. If, with ports 52 and 53 closed, the opening through port 39 exceeds that through port 38 the liquid pressure at the right of piston 31 required to dissipate the greater volume of flow through the normal outflow passage from that chamber will exceed the pressure required to effect discharge of the smaller quantity of liquid from the portion of chamber 30 at the left of piston 31. The piston will therefore come to rest at the position where the force of the high liquid pressure against its right face balances the force of the low liquid pressure against its left face and the pressure exerted by spring 32 combined.

During operation of the automobile at speeds above 40% of top speed under level road conditions, as indicated by point I in Figures 3 and 5 and point I' in Figure 6, lever 2 will have been swung sufficiently far in a clockwise direction so that the throttle will be opened fully. As the lever is swung farther, therefore, ratio lever 21 will be swung in a counterclockwise direction to tension spring 24. This action exerts a force on rod 26 tending to move valves 35 and 36 to the right, which is opposed by the resilience of spring 25. Springs 24 and 25 may be selected so that their relative stiffnesses are in proportion to the movement of ratio lever 21 desired to effect a predetermined corresponding movement of such valves. As shown, spring 25 is preferably much stiffer than spring 24 so that a given movement of lever 21 will effect a comparatively very small shift of the valves.

As greater power is required, either for purposes of acceleration or to maintain a higher vehicle speed, levers 2 and 21 will be swung farther, causing valves 35 and 36 to shift to the right. The openings through ports 38 and 39 are thus proportioned so that the supply of fluid to the right end of cylinder 30 will increase and that to its left end will decrease. The consequent change in resultant pressure on piston 31 will shift it to the left, which will vary the drive ratio sufficiently to produce the power desired at full load factor.

In the event that lever 2 is swung clockwise far enough to cause the transmission to shift to a drive ratio where the speed of the engine tends to exceed the speed at which it develops its rated power, or if it is swung in a counterclockwise direction sufficiently so that the throttle will be allowed to close partially, overriding controls affect the flow of liquid through chamber 30 so that the relative openings through ducts 38 and 39 no longer constitute the sole control over the pressure acting on piston 31. Such overriding mechanism operates by varying the facilities for discharge of hydraulic liquid from the portions of the chamber on the opposite sides of the piston.

The overriding mechanism consists of a further chamber 5 conveniently located alongside chamber 30, in which are located floating pistons 50 and 51, constituting valves. Piston 50 controls the opening through duct 52 from the portion of chamber 30 at the left of the piston 31 to an outflow port emptying into the collecting chamber formed by casing 3'. Piston 51 constitutes a valve controlling the opening through duct 53 between the portion of chamber 30 at the right of piston 31 and a passage leading to the casing 3'. It will be understood, therefore, that if duct 52 is opened, the rate of outflow from the left end of chamber 30 will be such that, assuming the rate of inflow to be constant, the pressure on the left end of the piston 31 will be decreased, resulting in such piston being moved toward the left by the superior pressure on its opposite end, to increase the drive ratio. On the contrary, when duct 53 is opened the increase in the total outflow passage from the right end of cylinder 30 will cause the pressure on the right side of the piston to drop, so that it will move to the right to decrease the drive ratio.

Valves 50 and 51 can never operate so that the effects of one will counteract those of the other, for pressure supplied by pump 42 to the portion of chamber 5 between them tends to move valve 50 to close duct 52 against the pressure of spring 54, while the pressure against valve 51 tends to open duct 53 in opposition to a stronger spring 55. The opposite ends of chamber 5 are vented so that no compression of fluid in such spaces can interfere with the operation of the valves. Plugs 56 and 57 fitting the ends of this chamber may be threaded, as indicated, for movement to adjust the tension of springs 54 and 55, respectively, in the event that it should be desired to alter the liquid pressure conditions required to effect movement of either of valves 50 and 51. The vents or drain openings 58 and 59 from the chamber 5 to the casing 3' may be formed in such plugs as shown in Fig. 2.

Initially spring 54 holds low speed valve 50 to the right, constituting underspeed means thus to maintain port 52 open as long as the engine speed remains below a predetermined operating speed range, and spring 55 presses high speed valve 51 to the left into position closing passage 53. As the pressure developed by pump 42 increases with increasing engine speed, valve 50 will be moved to the left in its end of cylinder 5 to compress spring 54 gradually until duct 52 is completely closed, which occurs in the example given at 12% of the rated engine speed under every load condition. Valve 51 is not moved by the liquid under such pressure sufficiently to open passage 53. The parts are shown in these positions in Figure 2. Thereafter neither duct is affected by movement of valves 50 and 51 as the vehicle speed increases until the speed of the engine approaches that at which its rated power is developed. When such speed is reached sufficient liquid pressure is produced by pump 42 to force valve 51 in its end of chamber 5 far enough to the right, against the opposition of spring 55, to open duct 53, thus constituting overspeed control means. Flow of liquid from the portion of chamber 30 at the right of piston 31 will relieve the pressure on the piston so that it will move to the right to reduce the drive ratio, and such movement will continue as long as the speed of the engine tends to exceed that at which its maximum power is developed.

If control lever 2 is swung in a clockwise direction sufficiently so that piston 31 assumes a position, by virtue of the relative openings through ducts 38 and 39, such that the drive ratio selected results in a tendency of the engine to overspeed above the speed necessary to produce its rated power, the pressure developed by pump 42 will move piston valve 51 to the right to open duct 53, as described. This represents the condition where the drive ratio which the inflow tends to establish corresponds to a point above the rated power speed line in Figure 6 and beyond the crest of the power available drive ratio curve, such as to the right of point V on drive ratio curve A—N in Figure 5. Even though the control lever is held in this position so that valves 35 and 36 maintain the same relative openings through ducts 38 and 39, the pressure on the right face of piston 31 will decrease because of the increased opportunity for liquid to flow out of the right end of chamber 30 by way of passage 53. Consequently the piston 31 will move to the right to reduce the drive ratio along line V—D of Figure 5 or V'—D' of Figure 6.

When the point D or D' is reached, valve 51 will remain closed because the engine cannot develop sufficient power to increase the speed of the vehicle further, unless, of course, it should begin to go down hill so that the power required decreases. In that event any tendency of the engine to overspeed will again open valve 51, decreasing the drive ratio further along line V—D or V'—D' extended. Overspeed of the engine would be prevented in this manner even if a handle were provided for lever 21 so that it could be swung counterclockwise by the driver to increase the drive ratio as far as possible while closing the engine throttle by swinging lever 2 counterclockwise out of contact with lever 21. By such manipulation the wheels would drive the engine through the transmission to afford braking control, but however steep the hill the engine speed could not be increased beyond that at which its rated power would be developed.

Conversely, if the car should begin to climb so that the power required increases, for example along line Z''—Z''' of Fig. 6, the drive ratio will automatically increase to that represented by the intersection of such power required curve with the rated speed line. Of course, either by adjustment of spring 55 by movement of plug 57, or by design of the spring or valve, the valve may be arranged to open duct 53 at some selected engine speed other than rated power speed. Such engine speed will be maintained in the same manner as the load on the vehicle increases or decreases, and the engine will operate at full load factor although not developing its rated power. Such operation is, of course, conditional upon valves 35 and 36 remaining in a position such that the resultant pressure on piston 31 tends to increase the drive ratio when duct 53 is closed.

When the vehicle is decelerating because of movement of lever 2 in a counterclockwise direction until ratio lever 21 engages its stop 23, valves 35 and 36 will be in a position such that duct 38 will be opened to its fullest extent and duct 39 will be restricted as much as possible. The pressure of spring 32 will hold piston 31 farthest to the right, assuming valves 50 and 51 close ports 52 and 53, respectively, for the opening through duct 39 will then not be appreciably greater, if any, than that through duct 38. When rod 26 is in its position farthest to the left the openings through these ducts are preferably about equal, although the opening through duct 38 may be greater than that through duct 39. Piston 31 will remain in this minimum drive ratio setting as long as lever 21 is against its stop 23, provided that the engine is operating at or above its minimum smooth speed corresponding to line W—X of Figure 6, whether the throttle is fully or partially open.

Any change in the power developed, whether increase or decrease, is accompanied by movement of piston 31 to the left, effected by a shift in valves 35 and 36 or valve 50, to increase the drive ratio from its minimum value. An increase in power is produced by swinging lever 2 clockwise and lever 21 counterclockwise to shift valves 35 and 36 to the right, which effects movement of piston 31 to the left to increase the drive ratio, enabling the speed of the engine to increase so that it will develop more power.

Conversely, when the power developed is decreased by swinging lever 2 counterclockwise to close the engine throttle sufficiently so that the engine speed tends to drop below its minimum value of line W—X, the drive ratio will be increased by the operation of valve 50. At an engine speed slightly less than such value the pressure developed by pump 42, driven in synchronism with the engine, will be insufficient to press valve 50 to the left with a force great enough to overcome the resilience of spring 54. Consequently duct 52 will be opened partially by movement of this valve to the right to increase the outflow of liquid from the left end of chamber 30. The increased pressure differential on piston 31 resulting from such reduction in pressure on its left face will move it to the left against the resilience of spring 32 into a new equilibrium position, corresponding to a sufficient increase in drive ratio to prevent an appreciable drop in engine speed below its selected minimum speed.

Each time the power required exceeds the power developed, so that the automobile decelerates and the speed of the engine tends to drop, valve 50 will open farther, to the extent necessary to readjust the drive ratio for maintaining the engine speed constant. These changes in drive ratio may be represented by progression to the left along line I'—W in Fig. 6. When the piston 31 is thus moved to the left to the position corresponding to the maximum drive ratio of line Y—M', the vehicle will be moving very slowly. As the speed decreases further thereafter, such as in coming to a stop, the engine speed may still be kept constant by partially or full uncoupling the engine from the drive shaft. This may be accomplished either by slippage within the transmission 16 itself, if it is of the hydraulic type, for example, and thus capable of such operation at slow speeds, or by a voluntary or automatic clutch 19 interposed between the transmission and the engine. Conveniently such clutch may be of the fluid type, which will slip automatically at low speeds.

Conversely, in starting the automobile, the clutch or transmission will continue to slip until the vehicle has attained a speed corresponding to the selected minimum speed of the engine at maximum drive ratio. If the automobile were started with the engine operating at its minimum speed, valve 50 would be in its position farthest to the right, and piston 31 would be farthest to the left in its maximum drive ratio position. Ordinarily in starting, however, the engine would be accelerated quickly beyond its minimum smooth speed, so that the pressure developed by pump 42 would close valve 50 immediately against the resilience of spring 54. The pressure will therefore be greater at the left of piston 31 so that the drive ratio will be decreased automatically in response to the increase in vehicle speed until either steady speed is achieved or control lever 2 has been shifted far enough to engage ratio lever 21. Upon such engagement, either for purposes of continuous acceleration or to establish a higher steady vehicle speed, valves 35 and 36 will be moved to shift piston 31 to the left for again increasing the drive ratio to the extent corresponding to the new position of ratio lever 21.

In order to maintain a constant engine speed by varying the drive ratio with the use of my mechanism, it is not necessary either that the speed selected be the minimum smooth engine speed, or that the engine operate at full load factor. As previously mentioned, valve 51 may be utilized to control the transmission-regulating movement of piston 31 for reducing the drive ratio of the transmission so as to limit the maximum engine speed when operating at full load factor, and also to prevent such speed being exceeded regardless of the load factor. Such reduced drive ratio will prevent relief of the engine loading which would induce an increase in engine speed above such a maximum speed selected. Conversely valve 50 can control the transmission-regulating movement of piston 31 for increasing the drive ratio of the transmission so as to prevent the engine speed dropping below some selected speed greater than the minimum smooth engine speed, as the power required or the fuel supply is varied. Such increased drive ratio will prevent loading of the engine which would induce a decrease in its speed below such minimum engine speed which would be determined previously. My control operates to select automatically the proper drive ratio so that the power developed by the engine at the load factor for which the fuel supply is regulated will be absorbed by the vehicle at the speed corresponding to the drive ratio established. Such maximum and minimum speeds may even be selected so close together that the drive ratio will be varied as necessary to enable the engine speed to remain substantially constant despite variation in the power developed. Such power, of course, will vary with the drive ratio, by appropriate adjustment of the throttle, according to the power required.

While the operation has been described in connection with an automobile it will be evident that transmission 16 might instead be connected to hoisting machinery or to a load of other type.

I claim as my invention:

1. Control mechanism for an infinitely variable drive ratio transmission driven by an engine, comprising fluid operated selector means operable to vary the drive ratio of the transmission, including a piston and cylinder combination operatively connected to such transmission, a source of fluid under substantially constant pressure, duct means for supplying fluid from said fluid source to said cylinder at opposite sides of said piston, and means controllable to vary relatively the supply of fluid from said pressure source to said cylinder at opposite sides of said piston to shift said piston and cylinder relatively for adjusting the transmission to change its drive ratio.

2. Control mechanism for an infinitely variable drive ratio transmission driven by an engine, comprising fluid operated selector means, including a piston and cylinder combination operatively connected to such transmission, and duct means for supplying fluid under pressure to said cylinder at opposite sides of said piston, voluntary means controllable to vary relatively the supply of fluid through said duct means to said cylinder at opposite sides of said piston to shift said piston and cylinder relatively for adjusting the transmission to change its drive ratio, and engine driven means driven in synchronism with such engine, operable automatically in response to a change in engine speed from a predetermined value to alter the relative pressures in said cylinder at opposite sides of said piston independently of said voluntary means, to effect shifting of said piston and cylinder for adjusting the transmission to change its drive ratio independently of said voluntary means sufficiently to prevent an appreciable departure from such predetermined engine speed.

3. Control mechanism for an infinitely variable drive ratio transmission driven by an engine, comprising selector means operable to vary the drive ratio of the transmission, voluntary means normally operable to control said selector means to establish a desired drive ratio of the transmission, engine driven means driven in synchronism with the engine, overspeed means operable by said engine driven means automatically in response to an increase in speed of the engine above a predetermined maximum value to alter said selector means independently of said voluntary means for reducing the drive ratio of the transmission sufficiently to prevent relief of the engine loading which would induce an increase in speed of the engine appreciably above such predetermined maximum value, and underspeed means operable by the same said engine driven means automatically in response to a decrease in speed of the engine to less than a predetermined minimum value to alter said selector means, independently of said voluntary means, for increasing the drive ratio of the transmission sufficiently to prevent loading of the engine which would induce a decrease in its speed appreciably below such predetermined minimum value.

4. Control mechanism for an infinitely variable drive ratio transmission driven by an engine, comprising fluid operated selector means operable to vary the drive ratio of the transmission, voluntary means controllable to vary the supply of fluid to said selector means tending to establish a desired drive ratio of the transmission, engine driven means driven in synchronism with the engine, overspeed means operable by said engine driven means automatically in response to an increase in speed of the engine above a predetermined maximum value to alter the effect of the fluid upon said selector means independently of said voluntary means for reducing the drive ratio of the transmission sufficiently to prevent relief of the engine loading which would induce an increase in speed of the engine appreciably above such predetermined maximum value, and underspeed means operable by the same said engine driven means automatically in response to a decrease in speed of the engine to less than a predetermined minimum value to alter the effect of the fluid upon said selector means independently of said voluntary means for increasing the drive ratio of the transmission sufficiently to prevent loading of the engine which would induce a decrease in its speed appreciably below such predetermined minimum value.

5. Control mechanism comprising an infinitely variable drive ratio transmission driven by an engine, fluid operated selector means, including a piston and cylinder combination, means operatively connecting said selector means to said transmission to vary the drive ratio thereof, means reacting between said piston and cylinder and urging said piston and cylinder to move relatively for moving said connecting means and said transmission in the direction reducing the drive ratio of the transmission, and control means operable to control the fluid pressure on said piston and cylinder to effect relative movement of said piston and cylinder in opposition to said reacting means and thereby moving said connecting means and said transmission in the direction for increasing the drive ratio of the transmission.

6. Control mechanism for an infinitely variable drive ratio transmission driven by an engine, comprising fluid operated selector means operable to vary the drive ratio of the transmission, including a piston and cylinder combination operatively connected to such transmission, spring means interposed between said cylinder and said piston urging them to move relatively for reducing the drive ratio of the transmission, a source of fluid under substantially constant pressure, duct means for supplying fluid from said fluid source to said cylinder at opposite sides of said piston, and voluntary means controllable to vary relatively the supply of fluid from said pressure source to said cylinder at opposite sides of said piston to shift said piston and cylinder relatively in opposition to said spring means for increasing the drive ratio of the transmission.

7. Control mechanism for an infinitely variable ratio transmission driven by an engine, comprising fluid operated selector means, including a piston and cylinder combination, operatively connected to said transmission, duct means for supplying fluid under pressure to said cylinder at opposite sides of said piston, voluntary means controllable to vary relatively the supply of fluid through said duct means to said cylinder at opposite sides of said piston to shift said piston and cylinder relatively for adjusting the transmission to change its drive ratio, engine driven means driven in synchronism with such engine, and over-speed means operable by said engine driven means automatically in response to an increase in speed of the engine above a predetermined maximum value to bleed fluid from said cylinder at one side of said piston, thereby to alter the fluid pressure on the piston and cylinder effected by said voluntary means, for reducing the drive ratio of the transmission sufficiently to prevent relief of the engine loading which would induce an increase in speed of the engine appreciably above such predetermined maximum value.

8. Control mechanism for an infinitely variable ratio transmission driven by an engine, comprising fluid operated selector means, including a piston and cylinder combination, operatively connected to said transmission, duct means for supplying fluid under pressure to said cylinder at opposite sides of said piston, voluntary means controllable to vary relatively the supply of fluid through said duct means to said cylinder at opposite sides of said piston to shift said piston and cylinder relatively for adjusting the transmission to change its drive ratio, engine driven means driven in synchronism with such engine, and under-speed means operable by said engine driven means automatically in response to progressive decrease in speed of the engine below a predetermined minimum value to bleed fluid from said cylinder at a progressively increasing rate, thereby to alter the fluid pressure on said piston and cylinder effected by said voluntary means, for progressively increasing the drive ratio of the transmission to prevent loading of the engine which would induce a decrease in its speed appreciably below such predetermined minimum value.

9. Control mechanism for an infinitely variable ratio transmission driven by an engine, comprising fluid operated selector means, including a piston and cylinder combination, operatively connected to said transmission, duct means for supplying fluid under pressure to said cylinder at opposite sides of said piston, voluntary means controllable to vary relatively the supply of fluid through said duct means to said cylinder at opposite sides of said piston to shift said piston and cylinder relatively for adjusting the transmission to change its drive ratio, engine driven means driven in synchronism with such engine, over-speed means operable by said engine driven means automatically in response to an increase in speed of the engine over a predetermined maximum value to bleed fluid from said cylinder at one side of said piston, thereby to alter the fluid pressure on the piston and cylinder effected by said voluntary means, for reducing the drive ratio of the transmission sufficiently to prevent relief of the engine loading which would induce an increase in speed of the engine appreciably above such predetermined maximum value, and under-speed means operable by the same said engine driven means automatically in response to a decrease in speed of the engine to less than a predetermined minimum value to bleed fluid from said cylinder at the opposite side of said piston, thereby to alter the fluid pressure on said piston and cylinder effected by said voluntary means, for increasing the drive ratio of the transmission sufficiently to prevent loading of the engine which would induce a decrease in its speed appreciably below such predetermined minimum value.

10. Control mechanism for an infinitely variable drive ratio transmission driven by an engine, comprising fluid operated selector means, including a piston and cylinder combination, operatively connected to such transmission, spring means interposed between said cylinder and said piston urging them to move relatively for decreasing the drive ratio of the transmission, a source of fluid under substantially constant pressure, voluntary means controllable to vary relatively the supply of fluid from said pressure source to said cylinder at opposite sides of said piston, to shift said piston and cylinder relatively in opposition to said spring means for increasing the drive ratio of the transmission, engine driven means driven in synchronism with such engine, over-speed bleed means operable by said engine driven means automatically in response to an increase in speed of the engine above a predetermined maximum value, to bleed fluid from said cylinder at one side of said piston for altering the fluid pressure on said cylinder and piston effected by said voluntary means to supplement the action of said spring means for reducing the drive ratio of the transmission to prevent relief of the engine loading which would induce an increase in speed of the engine appreciably above such predetermined value, and under-speed bleed means operable by the same said engine driven means automatically in response to progressive decrease in speed of the engine below a predetermined minimum value, to bleed fluid from the opposite side of said piston for altering the fluid pressure on said cylinder and piston to oppose increasingly the action of said spring means for increasing the drive ratio of the transmission to prevent loading of the engine which would induce a decrease in its speed appreciably below such predetermined minimum value.

BERNARD I. SEEGER.

REFERENCES CITED

The following references are of record in the file of this patent:

UNITED STATES PATENTS

| Number | Name | Date |
| --- | --- | --- |
| 1,587,645 | Hicguet | June 8, 1926 |
| 1,958,303 | Hayes | May 8, 1934 |
| 2,008,231 | Vincent | July 16, 1935 |
| 2,127,589 | Erban | Aug. 23, 1938 |
| 2,131,157 | Almen et al. | Sept. 27, 1938 |
| 2,178,356 | Brunner | Oct. 31, 1939 |
| 2,252,644 | Robin et al. | Aug. 12, 1941 |
| 2,294,251 | Strobridge | Aug. 25, 1942 |
| 2,330,581 | Hefel | Sept. 28, 1943 |
| 2,352,212 | Lang et al. | June 27, 1944 |